United States Patent Office 3,532,692
Patented Oct. 6, 1970

3,532,692
BRIGHTENING AGENTS OF THE BISTRIAZINYL-AMINOSTILBENE SERIES
Heinrich Gold and Ernst-August Kleinheidt, Cologne-Stammheim, Germany, assignors to Farbenfabriken Bayer Aktiengesellschaft, Leverkusen, Germany, a corporation of Germany
No Drawing. Filed May 2, 1967, Ser. No. 635,342
Int. Cl. C07d 55/22
U.S. Cl. 260—240          10 Claims

ABSTRACT OF THE DISCLOSURE

A process for producing brightening agents of the bis-triazinylaminostilbene series wherein cyanuric chloride is initially reacted with the water-soluble salts of an aromatic amine or aromatic amino sulfonic acid in the absence of acid binding agents and under strongly acid conditions below pH 4; the condensation product being thereafter reacted in the usual manner with the stilbene component and the resulting product optionally further reacted with amines or amine salts.

---

The present invention relates to an improvement in the process for the production of brightening agents of the bistriazinylaminostilbene series by condensation of cyanuric chloride and water-soluble salts of aromatic amines or aromatic amino sulfonic acids at a molecular ratio of approximately 1:1 in an aqueous medium which may contain organic solvents, preferably in quantities below 5 percent by weight, subsequently reacting the resulting condensation product with 4,4'-diaminostilbene - 2,2' - disulfonic acid or a salt thereof, preferably at a molecular ratio of approximately 2:1, and optionally further reacting the resulting reaction product with amines or amine salts, preferably at a molecular ratio of approximately 2:1, said improvement consisting in effecting the condensation of cyanuric chloride with the water-soluble salts of aromatic amines or aromatic amino sulfonic acids in the first step in the absence of an acid binding agent at pH values below 6, preferably at pH values below 4.

Examples of water-soluble salts of aromatic amines or aromatic amino sulfonic acids which are suitable for the condensation with cyanuric chloride in the first step, are hydrochlorides of aniline, chloroanilines and toluidines, as well as the alkali metal salts of sulfanilic acid and metanilic acid.

The reaction of the condensation product formed in the first step with 4,4'-diaminostilbene-2,2'-disulfonic acid or a salt thereof, which is required for the production of brightening agents of the bistriazinylaminostilbene series, can be accomplished in conventional manner; the aforesaid likewise applies to the optional further reaction of the resulting reaction products with amines or amine salts; suitable amines for this step include methylamine, dimethylamine, ethylamine, diethylamine, monoethanolamine, diethanolamine, N-methyl-ethanolamine, taurine, n-methyltaurine, morpholine, piperidine, pyrrolidine, aniline, chloroanilines, toluidines, sulfanilic acid, metanilic acid and aminobenzoic acid.

In many cases it has proved advantageous to perform the condensation of cyanuric chloride with the water-soluble salts of aromatic amines or aromatic aminosulfonic acids, which takes places in the first step, in the presence of a wetting agent. Suitable wetting agents are for example the reaction products of 1 mol of fatty alcohol with 5–8 mols of ethylene oxide as well as the alkali metal or ammonium salts of the acidic sulfuric acid esters of such reaction products.

The process according to the invention can be adopted with particular advantage in the production of bistriazinylaminostilbene compounds of the formula

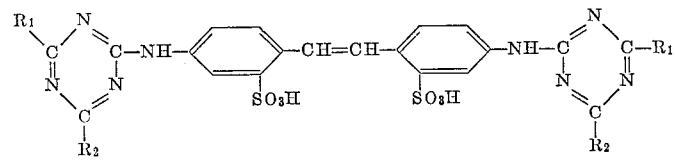

wherein $R_1$ represents the radical of an amine of the benzene series which is linked with the triazine ring via the amino group, or the radical of an amino benzene sulfonic acid or a salt thereof, which is linked with the triazine ring via the amino group, and $R_2$ means an $NH_2$-group or the radical of an aliphatic or aromatic amine or a salt thereof, which is linked with the triazine ring via the amino group; or salts thereof.

Preferred radicals $R_1$ are:

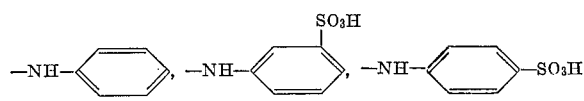

or a salt thereof;
Preferred radicals $R_2$ are: $-NH_2$, $-N(CH_2CH_2OH)_2$,

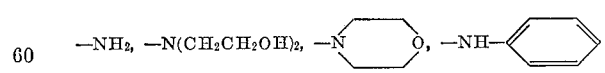

The herein described process is particularly suitable in the production of the compounds of Formula I, or the salts thereof, which are listed in the table below:

TABLE.—COMPOUNDS OF FORMULA (I)

| No. | R₁ | R₂ |
|---|---|---|
| 1 | —NH— | —N(CH₂CH₂OH)₂ |
| 2 | Same as above |  |
| 3 | do | —NH— |
| 4 | do | —N—CH₂CH₂OH<br>\|<br>CH₃ |
| 5 | —NH— | —N(CH₂CH₂OH)₂ |
| 6 | —NH——SO₃H | —N(CH₂CH₂OH)₂ |

It has already been described in Journal Soc. Dyers Col. 53, 1937, page 427, to react cyanuric chloride with water-soluble salts of aromatic amino sulfonic acids in aqueous medium in the presence of an acid binding agent. According to the aforesaid prior publication a reaction does not occur if the aqueous medium reacts weakly acid instead of neutral. Therefore, it was surprising and could not be foreseen that the condensation can also be carried out in acid aqueous medium.

The invention is further illustrated by the following examples without being restricted thereto, the parts given being parts by weight if not otherwise stated.

EXAMPLE 1

18.5 parts of cyanuric chloride are introduced at room temperature into 40 parts of 0.01 N hydrochloric acid to which 0.2 part of the reaction product of 1 mol of dodecyl alcohol with 5 mols of ethylene oxide has been added as wetting agent. The mixture the pH value of which is 2.5, is then treated, while stirring, with a solution of 18.27 parts of 3-aminobenzenesulfonic acid and 3.6 parts of sodium bicarbonate in 100 parts of water (the pH value of this solution is 3.5) for 10 minutes. After stirring for 30 minutes there is formed a clear solution wherein 3-aminobenzene-sulfonic acid can no longer be detected. A solution of 18.6 parts of the disodium salt of 4,4'-diamino-stilbene-2,2'-disulfonic acid in 165 parts of water is added and the temperature is simultaneously raised to 70–75° C. with the addition of 19 parts of sodium bicarbonate. After 30 minutes at this temperature, 4,4'-diaminostilbene-2,2'-disulfonic acid can no longer be detected. 24 parts of diethanolamine are then added, the solution boiled under reflux for 30 minutes and the resulting tetrasodium salt of 4,4' - bis - [2 - diethanolamino - 4 - (3''-sulfonilino)-1,3,5-triazinyl-(6)-amino]-stilbene-2,2'-disulfonic acid isolated by spraying the solution.

EXAMPLE 2

18.5 parts of cyanuric chloride are introduced into 40 parts of waters at 15–20° C., to which 0.2 part of the reaction product of 1 mol of dodecyl alcohol with 5 mols of ethylene oxide has been added as wetting agent. The mixture is then treated, while stirring for 15 minutes, with a solution of 17.9 parts of 4-aminobenzene-sulfonic acid and 5.8 parts of potassium hydroxide in 100 parts of water (pH value 7), whereupon the pH value rapidly drops to 2. After stirring for 10 minutes the temperature is raised to 40° C. and kept constant for another 45 minutes. The reaction mixture which has now a pH value of 1.5 and wherein practically 4-amino-benzene-sulfonic acid can no longer be detected, is treated with 7.8 parts of sodium bicarbonate, heated to 70° C. and a solution of 18.6 parts of the disodium salt of 4,4'-diaminostilbene-2,2'-disulfonic acid in 165 parts of water is added. The mixture is then heated to 80° C. and kept at this temperature for another 45 minutes. After the addition of 23 parts of diethanolamine the solution is boiled under reflux for 45 minutes, cooled to 90° C. and treated with 10 parts of hydrochloric acid (35%). The precipitated 4,4'-bis-[2-diethanolamino-4-(4''-sulfonilino) - 1,3,5 - triazinyl - (6)-amino]-stilbene-2,2'-disulfonic acid is filtered off with suction at 60° C. and dried in vacuum at 50° C. 45 parts are obtained.

EXAMPLE 3

18.5 parts of cyanuric acid are introduced at room temperature into 200 parts of water to which 0.5 part of the wetting agent described in Example 1 has been added. The mixture which has a pH value of 4 is then treated with a solution of 9.8 parts of aniline and 11.3 parts of concentrated hydrochloric acid in 200 parts of water whereupon the pH value drops to 1.3. The mixture is heated first to 40–45° C. for 60 minutes and then to 70° C. whereupon the pH value drops to 0.6; the amine is then completely used up. The suspension thus obtained is subsequently treated with a solution of 17.2 parts of the disodium salt of 4,4'-diaminostilbene-2,2'-disulfonic acid and 10 parts of sodium bicarbonate in 200 parts of water and the reaction mixture is kept at 70–80° C. for 60 minutes. 24.5 parts of diethanolamine are then added, the mixture boiled under reflux for 45 minutes, the solution filtered off with suction and adjusted to pH 4 by addition of 14 parts of concentrated hydrochloric acid. The precipitated 4,4'-bis-[2 - diethanolamino - 4-anilino-1,3,5-triazinyl(6)-amino]-stilbene-2,2'-disulfonic acid is filtered off with suction, washed with water and dried; 40 parts are obtained.

When using, instead of 24.5 parts of diethanolamine, 17.6 parts of N-methylethanolamine, there are obtained 38 parts of 4,4'-bis-[2-N-methylethanolamine-4-anilino-1,3,5-triazinyl-(6)-amino]-stilbene-2,2'-disulfonic acid.

EXAMPLE 4

18.5 parts of cyanuric chloride are stirred at room temperature with 8 parts of acetone and the paste thus obtained is treated at 25° C., while stirring, with 200 parts of water containing 0.2 part of the wetting agent described in Example 1. The mixture is then treated with a solution of 9.8 parts of aniline and 11.3 parts of concentrated hydrochloric acid in 200 parts of water whereupon the initial pH value of 4 drops to 1.3. The mixture is heated to 40° C. and kept at this temperature for 60 minutes. After that time the pH value of the mixture has dropped to 0.8; the aniline has practically disappeared. The suspension is subsequently treated with a solution of 17.2 parts of the disodium salt of 4,4'-diaminostilbene-2,2'-disulfonic acid and 25 parts of sodium bicarbonate in 200 parts of water, and heated to 70–80° C. After 60 minutes at this temperature 200 parts of water, 9 parts of sodium bicarbonate and 25 parts of aniline are added and the mixture is boiled under reflux for another 2 hours. The reaction product is filtered off with suction at 90° C. and washed with water until free of aniline. There are obtained 44.5 parts of the disodium salt of 4,4'-bis-[2,4-dianilino-1,3,5-triazinyl-(6)-amino]-stilbene-2,2'-disulfonic acid of a purely white appearance.

When using, instead of 25 parts of aniline, 21.5 parts of morpholine, there are obtained 42 parts of the disodium salt of 4,4'-bis-[2-mopholino-4-anilino-1,3,5-triazinyl-(6)-amino]-stilbene-2,2'-disulfonic acid.

We claim:

1. In the process for producing a brightening agent of the bis-triazinylaminostilbene series by condensation of cyanuric chloride with a water-soluble salt of an aromatic amine or aromatic amino sulfonic acid at a molecular ratio of about 1:1 in an aqueous medium and subsequently reacting the resulting condensation product with 4,4'-diamino-stilbene-2,2'-disulfonic acid or a salt thereof at a molecular ratio of approximately 2:1, the improvement which comprises condensing cyanuric chloride with the water-soluble salt of an aromatic amine or aromatic amino sulfonic acids in a strongly acid medium.

2. In the process for producing a brightening agent of the bis-triazinylaminostilbene series by condensation of cyanuric chloride with a water-soluble salt of an aromatic amine or aromatic amino sulfonic acid at a molecular ratio of about 1:1 in an aqueous medium substantially free of organic solvents, reacting the resulting condensation product with 4,4'-diamino-stilbene-2,2'-disulfonic acid and subsequently reacting the resulting intermediate product with an amine or amine salt, the improvement which comprises condensing cyanuric chloride with the water-soluble salt of an aromatic amine or aromatic amino sulfonic acid in a strongly acid medium.

3. The process of claim 2 wherein the subsequent reaction step involving the intermediate reaction product utilizes an amine reactant selected from the group consisting of methylamine, dimethylamine, ethylamine, diethylamine, monoethanolamine, diethanolamine, N-methylethanolamine, taurine, n-methyl-taurine, morpholine, piperidine, pyrrolidine, aniline, chloro-anilines, toluidines, sulfanilic acid, metanilic acid and amino-benzoic acid and the corresponding salt thereof.

4. Process of claim 1 which comprises carrying out the condensation reaction of cyanuric chloride with the water-soluble salts of aromatic amines or aromatic amino sulfonic acids at pH values below 4.

5. The process of claim 1 wherein the intermediate reaction product is reacted with aniline or a salt thereof.

6. The process of claim 1 wherein the intermediate reaction product is reacted with diethanolamine or a salt thereof.

7. The process of claim 1 wherein the intermediate reaction product is reacted with morpholine or a salt thereof.

8. In a process for producing a brightening agent of the bis-triazinylaminostilbene series by condensation of cyanuric chloride with a water-soluble salt of 3-amino benzene sulfonic acid at a molecular ratio of approximately 1:1 in an aqueous medium, reacting the resulting condensation product with 4,4'-diaminostilbene-2,2'-disulfonic acid or a salt thereof at a molecular ratio of approximately 2:1, and further reacting the resulting intermediate reaction product with diethanolamine or a salt of diethanolamine, the improvement which comprises initially condensing cyanuric chloride with a water-soluble salt of 3-aminobenzene sulfonic acid in a strongly acid medium.

9. The process of claim 2 wherein the condensation of cyanuric chloride with amine salt is effected at pH values below 4.

10. The process of claim 9 wherein the amine salt is an amine of the benzene series or an amino sulfonic acid of the benzene series.

References Cited

UNITED STATES PATENTS 3,239,513   4/1966   Hausermann _____ 260—240

FOREIGN PATENTS 1,201,00   7/1959   France.

JOHN D. RANDOLPH, Primary Examiner

U.S. Cl. X.R.

260—247.5, 249.8